though the addition of the reducing substance may be carried out with a solid (e.g. pulverulent) reducing agent or a mixture thereof, it has been found to be preferable to add an aqueous solution of the reducing substances to the concentrated potassium-hydroxide product at the outlet of the nickel concentrator just prior to its introduction into the iron drums mentioned earlier. The reducing agent is added before the product enters the iron drums when the temperature of the liquid potassium-hydroxide stream still exceeds 250° C. and is preferably between 270° and 300° C.

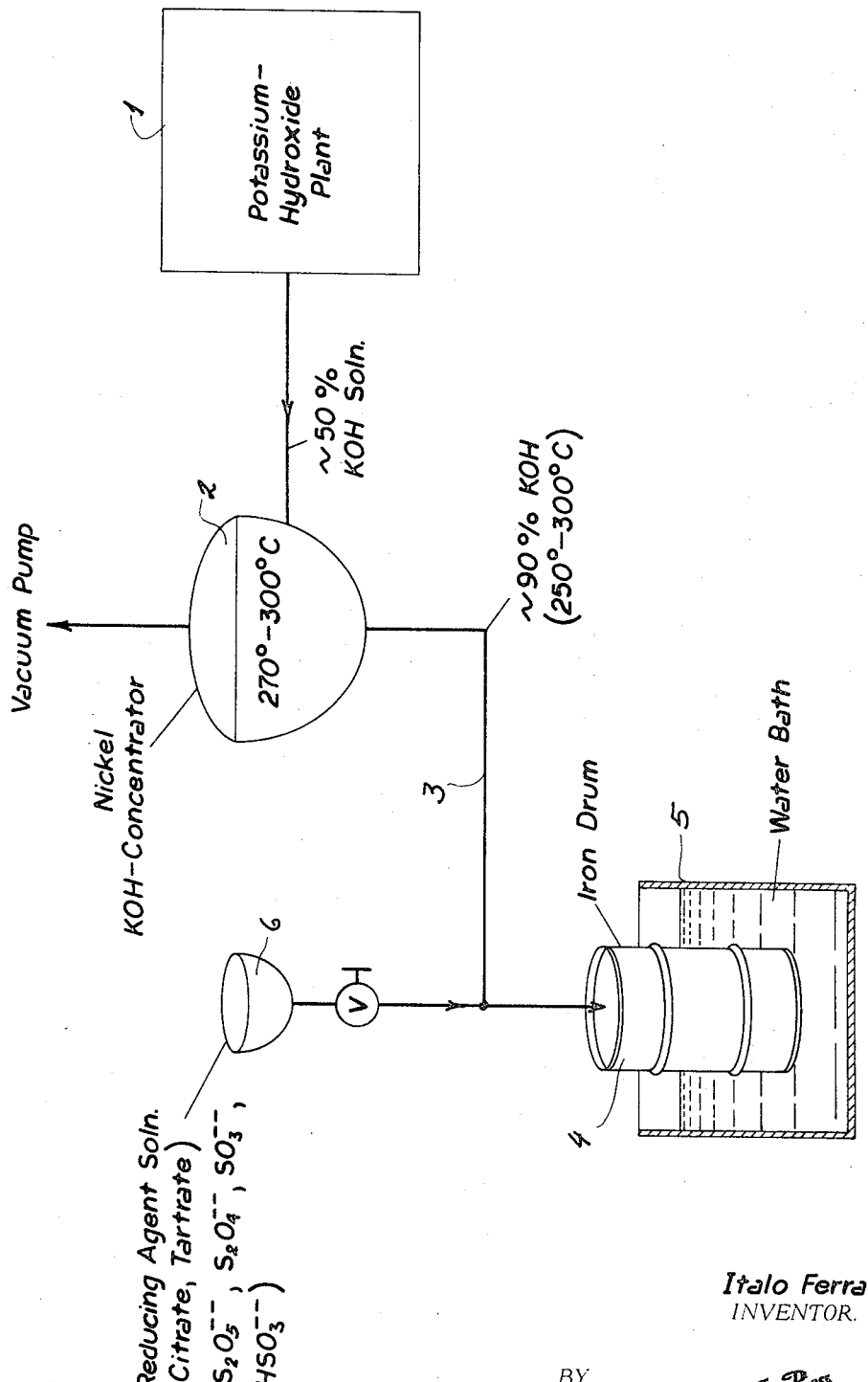

United States Patent Office 3,436,178
Patented Apr. 1, 1969

3,436,178
METHOD OF OBTAINING CONCENTRATED POTASSIUM HYDROXIDE IN A COLORLESS CONDITION
Italo Ferrara, Siracusa, Italy, assignor to Sincat-Società Industriale Catanese S.p.A., Palermo, Italy, a corporation of Italy
Filed Sept. 12, 1966, Ser. No. 578,846
Claims priority, application Italy, Sept. 14, 1965,
20,479/65, 20,480/65
Int. Cl. C01d 1/04
U.S. Cl. 23—184     7 Claims

ABSTRACT OF THE DISCLOSURE

Method of discoloring potassium hydroxide after concentration thereof by evaporation wherein a reducing agent from the group of alkali-metal citrates and tartrates (preferably sodium citrate or sodium potassium tartrate) is added to the potassium hydroxide as it emerges from a nickel concentrating vessel at a temperature between 250° C. and 300° C. (preferably above 270° C.). The proportion of citrates or tartrates preferably is in the range of 0.001 to 0.01% by weight.

My present invention relates to a method of obtaining colorless highly concentrated potassium hydroxide and, more particularly, to improvements in a process for producing high-titer potassium hydroxide.

In prior method of producing concentrated potassium hydroxide (generated by electrolysis of KCl for example) and, eventually, potassium hydroxide titering approximately 90% or thereabouts, a potassium-hydroxide solution with a concentration of about 50% is subjected to continuous evaporation under vacuum in nickel concentrating vessels. The substantially pure liquid potassium hydroxide (titering 90% or more) emerges from the concentrators at a temperature slightly below 300° C. (i.e. at the concentration temperature) and is poured into iron drums cooled externally by water. The resulting product has a more or less intense dark-gray coloration which, I have found, is due to a corrosive action by the potassium-hydroxide solution upon the nickel walls of the concentrating vessel and the formation of colored nickel compounds.

It is, therefore, the principal object of the present invention to provide an improved method of obtaining a substantially colorless high-titer potassium hydroxide.

A further object of this invention is to provide a method, in a process for producing potassium hydroxide involving the concentration of a potassium-hydroxide solution in a nickel evaporator at elevated temperature, whereby a substantially colorless concentrated potassium-hydroxide product can be obtained.

I found that, in accordance with the principal aspect of the present invention, the concentrated potassium hydroxide emerging from a nickel concentrator can be clarified or rendered substantially colorless by addition to the molten potassium hydroxide, prior to its introduction into the iron drums (as is conventional in most cases) of small quantities of a reducing substance capable of interacting with the nickel entrained in the emerging product liquid to produce colorless reaction products.

More particularly, small quantities of at least one reducing substance selected from the group consisting of the alkaline-metal salts of citric and tartaric acids and especially the sodium and potassium salts thereof have proved to be effective. Preferably sodium citrate and sodium potassium tartrate are used individually or in combination.

According to another aspect of this invention the reducing substance is selected from the group of ionizable inorganic compounds containing metabisulphite ($S_2O_5^{--}$), hydrosulphite ($S_2O_4^{--}$), sulphite ($SO_3^{--}$) and bisulphite ($HSO_3^{--}$) ions. Of this latter class of compounds, the alkaline-metal salts and preferably the sodium or potassium salts of the metabisulphites, hydrosulphites, sulphites and bisulphites have proved to be most effective, the compounds being used either individually or in mutual admixture.

Although the addition of the reducing substance may be carried out with a solid (e.g. pulverulent) reducing agent or a mixture thereof, it has been found to be preferable to add an aqueous solution of the reducing substances to the concentrated potassium-hydroxide product at the outlet of the nickel concentrator just prior to its introduction into the iron drums mentioned earlier. The reducing agent is added before the product enters the iron drums when the temperature of the liquid potassium-hydroxide stream still exceeds 250° C. and is preferably between 270° and 300° C.

The quantities of the reducing substances will, of course, depend upon the concentration of the nickel in the potassium hydroxide so that higher nickel contents will require correspondingly higher quantities of the reducing substances individually or together. For the common potassium-hydroxide concentrations of 90 to 91% by weight, for example, which may have a nickel content between 0.0001 and 0.001% by weight, the quantity of reducing substance to be employed will preferably range between 0.001 and 0.01% by weight with respect to the potassium-hydroxide concentration calculated at 100%.

In general terms, therefore, it can be stated that the weight ratio of the reducing substance—when the latter is a citrate or tartrate salt—to the nickel concentration will be of the order of 10 to 1. When the reducing agents are of the sulphite class (e.g. sodium metabilsulphite, sodium hydrosulphite, sodium sulphite and sodium bisulphite), a similar relationship is suitable.

More specifically, the proportion of sodium metabisulphite should range between 0.001 and 0.005%, the concentration of sodium hydrosulphite should range between 0.001 and 0.005%, the concentration of sodium sulphite should range between 0.002 and 0.02% and the concentration of sodium bisulphite should range between 0.005 and 0.01% for the potassium-hydroxide products mentioned.

The above and other objects, features and advantages of the present invention will become more readily apparent from the following description, reference being made to the accompanying drawing, the sole figure of which represents a flow diagram illustrating the principles of the present invention, and the following group of specific examples illustrating the inventive idea.

In the drawing, I show a potassium-hydroxide plant 1 whose product generally is a potasium-hydroxide solution of a concentration of approximately the order of 50%, this aqueous solution of potasium hydroxide being fed to nickel concentrators 2, there to be subjected to evaporation under vacuum at temperatures of 250° to 300° C. The high-titer potassium hydroxide 3 emerging from the nickel concentrators is introduced into iron drums 4 which are shown diagrammatically to be water-cooled in a bath at 5. In accordance with the principles of this invention, a solution of the reducing substance is added dropwise from a dispenser 6 into the product stream 3 while the latter is at a temperature above 250° C. and usually of the order of 270° to 300° C. at a rate determined by the concentration of nickel in the product.

Example I

The solution of sodium citrate made up to contain 0.002 kg. of sodium citrate per 100 kg. of potassium hydroxide (at 100% concentration) is dripped via the dripping dispenser illustrated in the drawing into the potassium-hydroxide product emerging from a nickel concentrator and having a potassium hydroxide titer of 91.3% by weight and a nickel content of 0.0003%. The addition of the reducing-agent solution is carried out immediately prior to the introduction of the potassium hydroxide into the drums while the potassium hydroxide is yet at a temperature between 270° and 300° C. A sample is abstracted from the product stream after introduction of the reducing agent and is cooled. Upon examination, the sample was found to have a colorless appearance. Another sample of the same product stream, not subjected to addition of the reducing substance, had a dark-gray coloration.

Example II

A solution of sodium citrate calculated so as to introduce 0.004 kg. of sodium citrate (in aqueous solution) per 100 kg. of potassium hydroxide (at 100%) was dripped onto a stream of potassium hydroxide emerging from the nickel concentrators as illustrated in the drawing. The potassium hydroxide had a concentration of 90.8% per weight KOH and a content of 0.0005% nickel. The reducing solution was added immediately prior to the introduction of the potassium hydroxide into iron drums at a temperature of the potassium hydroxide between 270° and 300° C. A sample of the potassium hydroxide thus treated, when examined after cooling, was substantially colorless whereas another sample of the potassium-hydroxide product not subjected to treatment with the reducing agent had a dark-gray color.

Example III

An aqueous solution of sodium potassium tartrate, calculated so as to be equivalent to 0.002 kg. of sodium potassium tartrate per 100 kg. of potassium hydroxide (at 100%) was added to the concentrated potassium hydroxide which had a titer of 90.2% KOH and a nickel content of 0.00025%. The reducing solution was again added immediately prior to introduction of the hot KOH to iron drums with the stream at a temperature of 270° to 300° C. A sample of the potassium hydroxide thus treated, when examined after cooling, was colorless; another sample of the potasium hydroxide—without treatment with the reducing agent—had a dark-gray coloration.

Example IV

A solution of sodium potasium tartrate equivalent to 0.007 kg. of sodium potassium tartrate per 100 kg. of potassium hydroxide (at 100%), when dripped into a potassium-hydroxide stream emerging from nickel concentrators and having a KOH titer of 91.0%; the potassium hydroxide also has a nickel concentration of 0.0008%. The temperature of the potassium-hydroxide stream ranged between 270° and 300° C. at the time of treatment. A sample of the potassium-hydroxide product thus treated, when examined after cooling, appeared to be colorless while a further sample without treatment had an intense-gray coloration.

When the solution of the reducing substance of Example No. I was replaced by a solution having half the quantity of sodium citrate replaced by the weight equivalent of sodium potassium tartrate similar results were obtained.

Example V

A solution of sodium metabisulphite designed to provide 0.0025 kg. of sodium metabisulphite per 100 kg. of potassium hydroxide (at 100%) was dripped unto potassium-hydroxide stream emerging from a nickel concentrator with a KOH titer of 90.7%, a nickel content of 0.0009% and a temperature between 270° and 300° C., prior to any significant cooling of the concentrated caustic. A sample of the potassium-hydroxide solution thus treated, when examined after cooling, was essentially colorless while a further sample not subjected to treatment with the reducing substance, was of dark-gray coloration.

Example VI

An aqueous solution of sodium metabisulphite calculated at 0.004 kg. of sodium metabisulphite per 100 kg. potassium hydroxide (at 100%) was dripped onto a potassium-hydroxide stream emerging from a nickel concentrator prior to its introduction into iron drums cooled in a water bath. The potassium-hydroxide stream had a KOH titer of 90.8% and a nickel content of 0.001%. The addition of the reducing solution was carried out when the potassium-hydroxide stream was at a temperature between 270° and 300° C. The treated potassium hydroxide was found to be colorless, whereas the potassium hydroxide without treatment had a dark-gray coloration.

Example VII

An aqueous solution of sodium metabisulphite calculated to yield 0.002 kg. of sodium metabisulphite per 100 kg. of potassium hydroxide at 100% was dripped into the potassium-hydroxide stream which, in this case, had a KOH titer of 91.0% and a nickel content of 0.0003%. Again the temperature of the potassium-hydroxide stream ranged between 270° and 300° C. as it left the nickel concentrators and was treated with the reducing agent. The treated product was substantially colorless whereas the product prior to treatment with the reducing agent had a dark-gray coloration.

Example VIII

A solution of reducing agent was prepared in such manner as to obtain 0.0017 kg. of sodium metabisulphite per 100 kg. of KOH (at 100%) and dripped into potassium hydroxide having a titer in KOH of 90.6% and a content in Ni of 0.0001%.

The addition of this solution was carried out immediately prior to the filling of iron drums with the potassium hydroxide, when the latter was at a temperature between 270° and 300° C., emerging from a nickel concentrator.

A sample thus treated, when examined after cooling, appeared to be colorless, while a sample of the same potassium hydroxide but not subjected to the treatment with the reducing substance, had a dark-gray coloring.

Example IX

A solution of sodium hydrosulphite designed to yield 0.002 kg. of sodium hydrosulphite per 100 kg. of KOH (at 100%), was added dropwise to potassium hydroxide having a titer of 90.5% KOH and a nickel content of 0.0008%.

The addition of this solution was carried out immediately prior to the introduction of the potassium hydroxide into the drums, when the potassium hydroxide was at a temperature between 270° and 300° C.

A sample thus treated, when examined after cooling, appeared to be colorless, while another sample of the same potassium hydroxide, but not subjected to the treatment with the reducing substance, appeared to be of a dark-gray color.

Example X

A solution of sodium sulphite calculated so as to obtain 0.003 kg. of sodium sulphite per 100 kg. of KOH (at 100%), was dripped into potassium hydroxide having a KOH titer of 90.7% and a nickel content of 0.0008%.

The addition of this solution was carried out immediately prior to the introduction of the potassium hydroxide into the drums when the potassium hydroxide was at a temperature between 270° and 300° C.

A sample thus treated, when examined after cooling, appeared to be colorless, while another sample of the same potassium hydroxide, but not subjected to the treatment with the reducing substance, appeared to be dark-gray.

Example XI

A solution of sodium bisulphite calculated so as to contain 0.005 kg. of sodium bisulphite per 100 kg. of KOH (at 100%), was fed drop-by-drop to potassium hydroxide having a titer of 91.0% KOH and a content in Ni of 0.0007%.

The addition of this solution was carried out immediately prior to the filling of iron drums with the potassium hydroxide, while it still was at a temperature between 270° and 300° C.

A sample thus treated, when examined after cooling, appeared to be colorless, while another sample of the same potassium hydroxide, but not subjected to the treatment with the reducing substance, was of dark-gray coloration.

When potassium salts of the reducing ions were substituted for the sodium salts, and when the reducing salts were added in the powdered state instead of in solution, substantial decoloration of the concentrated KOH was also obtained.

I claim:

1. In a process for producing concentrated potassium hydroxide of a high KOH titer wherein a potassium-hydroxide solution is subjected to concentration by evaporation at an elevated temperature in a nickel concentrating vessel whereby a coloration is imparted to the concentrated potassium hydroxide emerging from said vessel, the improvement which comprises the step of adding to the concentrated potassium hydroxide emerging from said vessel while it is at a temperature between substantially 250° and 300° C. and before it is introduced into cooled drums at least one reducing agent selected from the group consisting of alkali-metal citrates and tartrates capable of interacting with nickel compounds entrained in the emerging potassium-hydroxide stream to form substantially colorless products therewith.

2. The improvement defined in claim 1 wherein said reducing agent is added to said potassium hydroxide emerging from said vessel while it is at a temperature between 270° C. and 300° C.

3. The improvement as defined in claim 1 wherein said potassium hydroxide emerging from said vessel titers at least 90% KOH and contains between 0.0001 and 0.001% by weight nickel, said reducing agent being added to the potassium hydroxide emerging from said vessel in an amount ranging between 0.001 and 0.01% by weight.

4. A method of clarifying a colored concentrated potassium hydroxide titering at least 90% KOH and containing nickel upon its emergence from a nickel concentrating vessel at a temperature between 270° and 300° C., comprising the steps of:
   adding to the potassium hydroxide at said temperature a reducing agent from the group of alkali-metal citrates and tartrates; and
   thereafer cooling the potassium hydroxide.

5. The improvement defined in claim 1 wherein said reducing agent is added to the potassium hydroxide in the form of a solution.

6. The improvement defined in claim 1 wherein the reducing agent is sodium potassium tartrate.

7. The improvement defined in claim 1 wherein said reducing agent is sodium citrate.

References Cited

UNITED STATES PATENTS

| | | | |
|---|---|---|---|
| 2,562,169 | 7/1951 | Brumbaugh | 23—184 |
| 2,735,750 | 2/1956 | Rahn | 23—184 |
| 2,889,204 | 6/1959 | Meyer et al. | 23—184 |
| 3,325,251 | 6/1967 | Akker | 23—184 |

EDWARD J. MEROS, *Primary Examiner.*